United States Patent [19]

Lobley

[11] Patent Number: 4,693,148

[45] Date of Patent: Sep. 15, 1987

[54] GLASSWORKING SCROLL CHUCK WITH INTERCHANGEABLE JAWS

[75] Inventor: David M. Lobley, Quakertown, Pa.

[73] Assignee: Andrew J. Wargo, Hellertown, Pa.

[21] Appl. No.: 876,833

[22] Filed: Jun. 20, 1986

[51] Int. Cl.$^4$ ............................................. B23B 31/02
[52] U.S. Cl. ................................. 82/40 R; 279/1 DA;
279/1 DC; 279/114; 279/117; 279/123
[58] Field of Search ................ 279/1 R, 1 DA, 1 DC,
279/106, 114, 117, 123; 82/40 R

[56] References Cited

U.S. PATENT DOCUMENTS

| | | | |
|---|---|---|---|
| 2,429,524 | 10/1947 | Oetzel | 279/114 |
| 2,523,374 | 9/1950 | Jensen | 279/114 |
| 2,796,313 | 6/1957 | Schumacher | 279/106 |
| 3,612,254 | 10/1971 | Wideman | 279/106 |

OTHER PUBLICATIONS

*FUSION* Magazine Feb., 1986, pp. 19, 35, 64 American Scientific Glassblowers Society; Toledo, Ohio.

*Primary Examiner*—Nicholas P. Godici
*Assistant Examiner*—Jerry Kearns
*Attorney, Agent, or Firm*—Charles N. Quinn

[57] ABSTRACT

This invention provides a chuck for a glassworking lathe which includes a chuck body rotatable with a drive spindle nose about a longitudinal axis and a handwheel rotatable about the same longitudinal axis. A locking device is provided for releasably locking the handwheel to the chuck body for unitary rotation of the handwheel with the chuck body. A spiral gear or scroll is fixed to the handwheel to define a radially extending path of spiral movement relative to a longitudinal axis upon rotation of the spiral gear. A plurality of jaw base members include spiral gear grooves for meshingly engaging the spiral gear, are angularly spaced about the axis and are movable radially with respect to the axis upon rotation of the spiral gear engaging the gear grooves formed in the bottom of each of the jaw base members. Each jaw base member is adapted for optional complemental mating the a corresponding jaw outer member or with a planetary beam assembly thereby permitting the chuck to be configured as a scroll chuck or as a planetary chuck, at the option of the user.

32 Claims, 12 Drawing Figures

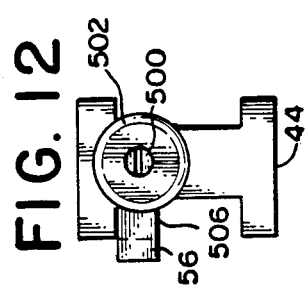
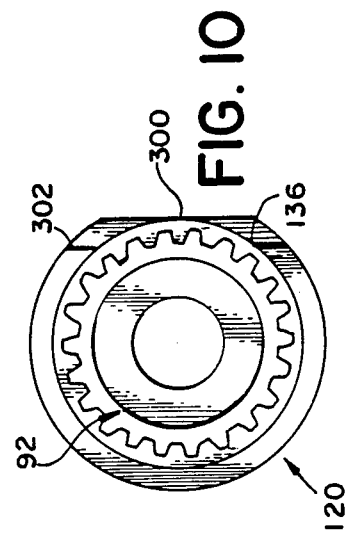
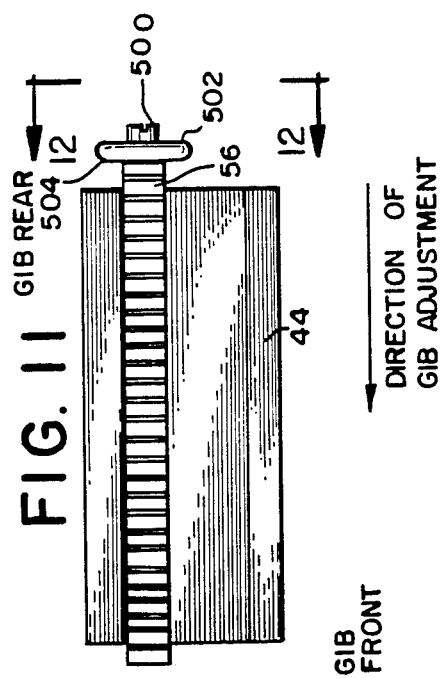

GLASSWORKING SCROLL CHUCK WITH INTERCHANGEABLE JAWS

BACKGROUND OF THE INVENTION

1. Field of the Invention

This invention relates to glassworking chucks and to glassworking lathes equipped with such chucks.

2. Description of the Prior Art

Scroll glassworking chucks are known for use with glassworking lathes. These chucks typically consist of a chuck body retaining chuck jaws in meshing engagement with a scroll gear coupled to a handwheel which permits opening and closing of the chuck jaws. One disadvantage of the scroll or universal chuck is that the jaws cannot be opened sufficiently far to accommodate large workpieces.

Planetary chucks are also known, typically operating in response to rotation of a ring gear contained within the chuck housing. Pinion gears connected to the chuck arms engage the ring gear and rotate the chuck arms thereby opening or closing the arms depending on the direction of rotation, in response to rotation of the ring gear.

A major disadvantage of the planetary chuck is the need for a key or wrench to open and close the arms of the jaws. Sometimes workers leave that key or wrench in the chuck after placing the workpiece in the chuck and turn on the lathe. This creates a very dangerous situation in that the key or wrench may fly out of the chuck striking the operator and/or the workpiece, thereby resulting in bodily harm to the operator and damage or destruction of the workpiece or both. Additionally, the key or wrench is generally lost in such situations and, resultantly, after the accident, it may be impossible to open the chuck jaws to release the broken or damaged workpiece therefrom.

SUMMARY OF THE INVENTION

In one of its aspects this invention provides a chuck for a glassworking lathe which includes a chuck body rotatable with a drive spindle nose about a longitudinal axis and a handwheel rotatable about the same longitudinal axis. Means are provided for releasably locking the handwheel to the chuck body for unitary rotation of the handwheel with the chuck body. A spiral gear or scroll is fixed to the handwheel to define a radially extending path of spiral movement relative to a longitudinal axis upon rotation of the spiral gear. A plurality of jaw base members include spiral gear grooves for meshingly engaging the spiral gear, are angularly spaced about the axis and are movable radially with respect to the axis upon rotation of the spiral gear engaging the gear grooves formed in the bottom of each of the jaw base members. Each jaw base member is adapted for optional complemental mating with a corresponding jaw outer member or with a planetary beam assembly thereby permitting the chuck to be configured as a scroll chuck or as a planetary chuck, at the option of the user.

Each jaw base member includes a radially extending rack projecting outwardly from the jaw base member, means for adjustably longitudinally and radially positioning the rack with respect to the remainder of the jaw base member and includes a mating surface formed for complemental mating with a corresponding outer jaw member.

The outer jaw members are removably connected to the jaw base members by means provided for retaining the outer jaw members in removable connection with the jaw base members.

The chuck body faces the spiral gear and is rotatable about the longitudinal axis with the drive nose spindle independently of the spiral gear. The chuck body provides means for retaining the jaw base members in meshing engagement with the spiral gear by retaining the spiral grooves formed in the bottoms of the jaw base members in meshing engagement with the spiral gear. Radial slots are formed in the chuck body. The jaw base members reside within the radial slots, travelling back and forth within the radial slots upon rotation of the spiral gear tooth relative to the chuck body.

Further provided is a plurality of planetary beam assemblies, individual ones of which are adapted for a movable pivotal mounting on the chuck body in sockets which are adjacent to the racks on the jaw base members. The planetary beam assemblies engage the racks of the jaw base members in the absence of the outer jaw members (that is, when the outer jaw members have been removed from the jaw base members) and are movable rotatably in sockets formed in the chuck body. The sockets define axes parallel with the longitudinal axis, about which the radial beam assemblies rotate upon radial movement of the jaw base members and associated racks responsively to rotation of the handwheel.

Each planetary beam assembly includes a pivot pin adapted for engagement within a socket formed in the chuck body and defining an axis of rotation of a pinion gear portion of the planetary beam assembly. Each planetary beam assembly further includes a pinion gear rotatable relative to the pivot pin and adapted to meshingly engage a radially extending rack affixed to an adjacent jaw base member so that upon radial movement of the jaw base member, the pinion gear is rotatably driven. Each planetary beam assembly further includes an arm which is rotatable unitarily with the pinion gear about the pivot pin and a jaw rod extending from the arm parallel to the longitudinal axis and at an end of the arm remote from the pinion gear. The jaw rod is adapted to secure a workpiece, upon rotating closure of the group of arms about the workpiece which occurs unitarily with rotation of the pinion gears responsively to rotary movement of the handwheel relative to the chuck body and resultant radial movement of the jaw base members and associated racks engaging the pinion gears.

BRIEF DESCRIPTION OF THE DRAWINGS

FIG. 10 is a view taken at 10—10 in FIG. 9 illustrating features of the floating pinion gear shield portion of the invention.

FIG. 11 is a partial side elevation taken at 11—11 in FIG. 7.

FIG. 12 is an end elevation taken looking at FIG. 11 from the right-hand side at arrows 12—12.

DESCRIPTION OF THE PREFERRED EMBODIMENTS

Figure 1:
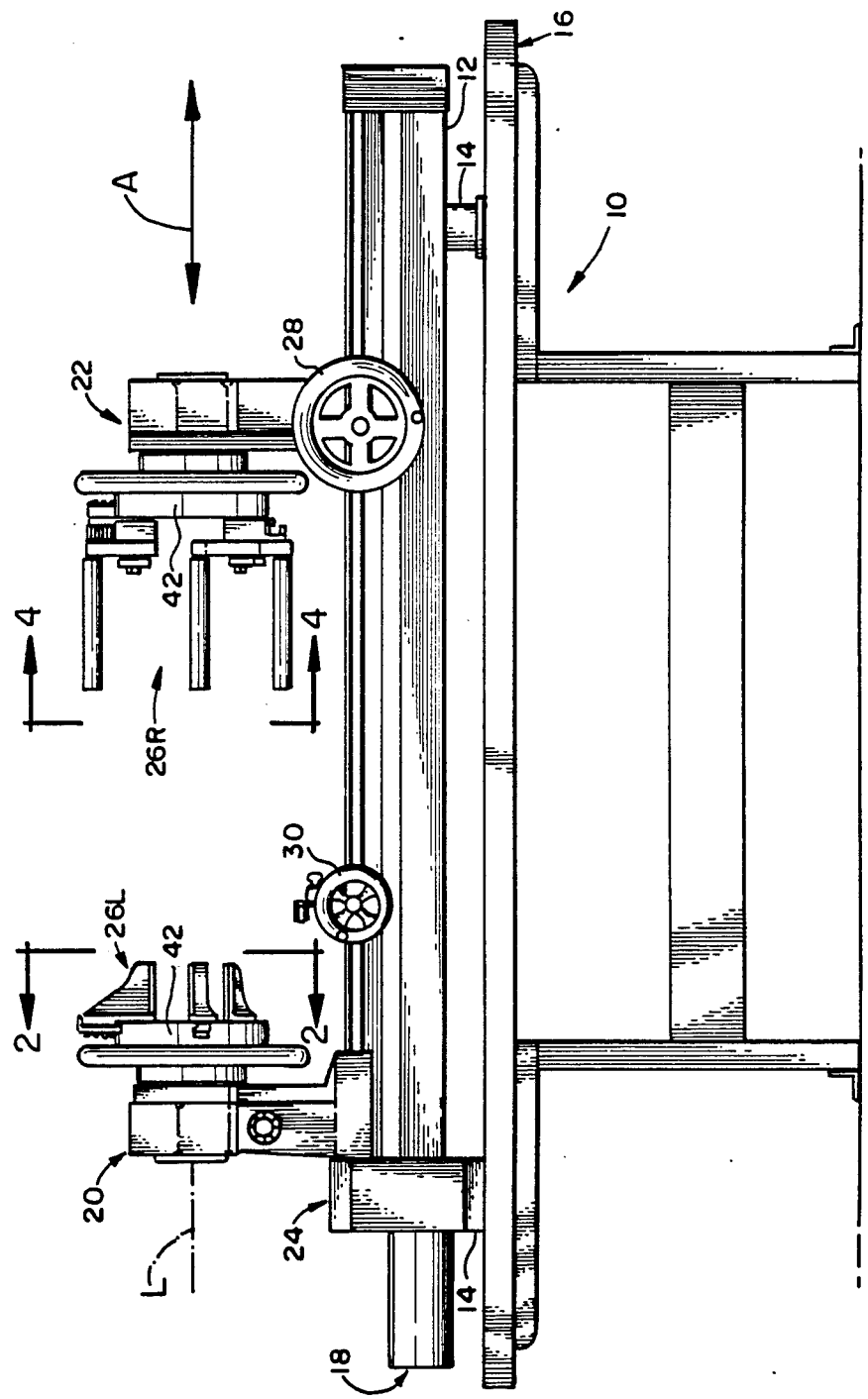
FIG. 1 is a schematic front elevation of a glassworking lathe including two chucks embodying the invention.

Referring to the drawings in general and particularly to FIG. 1, a glassworking lathe, equipped with two chucks embodying the invention, is designated generally 10 and includes a longitudinally elongated generally horizontal bed designated generally 12 supported by two feet 14 on a workbench designated generally 16. Lathe 10 includes a motor designated generally 18, shown only schematically, and two upright members designated generally 20 and 22 respectively. Upright member 22 is movable longitudinally along lathe bed 12, back and forth in the direction indicated generally by arrow A. Upright member 20 is fixed at the position shown, generally at the left-hand extremity of lathe bed 12.

Lathe 10 further includes means, designated generally 24, for transmitting rotational motion from an output shaft of motor 18 along the longitudinal length of lathe bed 12 and generally interior of upright members 20, 22, for rotation of respective inwardly facing chucks designated generally 26L and 26R in FIG. 1. Upright members 20, 22 have chucks 26L, 26R mounted thereon respectively with chucks 26L, 26R positioned for holding longitudinally extending generally tubular glass workpieces therebetween.

Chuck 26R, at the right-hand side of lathe 10, is powered for rotational motion as well as chuck 26L. This is because when turning a glass workpiece, using the glassworking lathe illustrated in FIG. 1 and embodying aspects of the invention, both ends of the longitudinally elongated and usually tubular workpiece must be rotated simultaneously, to minimize stresses in the glass workpiece thereby to avoid breaking the glass workpiece. Consequently, means 24 for transmitting rotary motion supplied by the output shaft of motor 18 rotates both chucks 26L and 26R via suitable drive means located within upright members 20 and 22. Motor 18, rotary power transmitting means 24 and upright members 20, 22 are conventional and form no part of the invention, other than in combination with the chucks 26L, 26R.

Upright member 22 is movable in the direction generally defined by arrow A via rotation of a handwheel 28 which engages a suitable rack or other member forming a part of bed 12 of lathe 10. Similarly, handwheel 30 is provided for moving a traverse table along the length of bed 12 of lathe 10, where the traverse table can support a tool or other device needed to operate on the appropriate workpiece held by the two chucks 26L and 26R.

Figure 3:
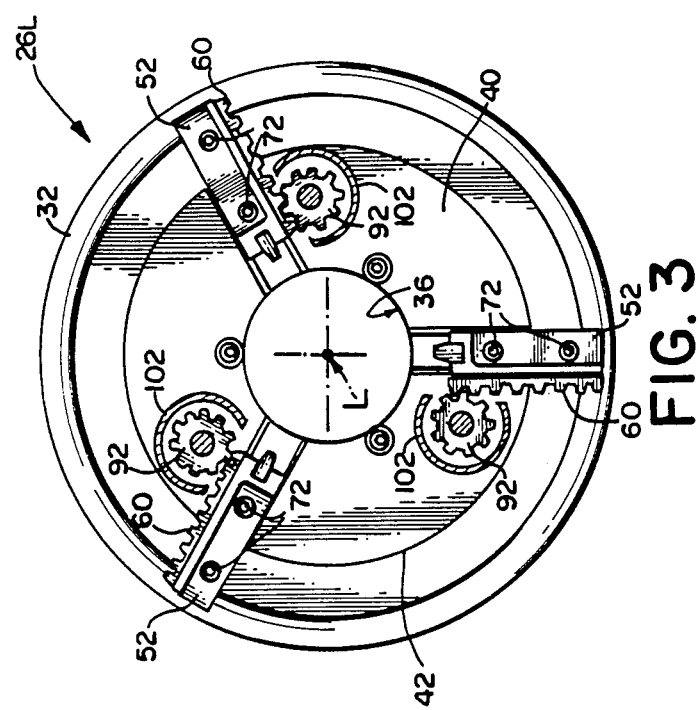
FIG. 3 is a broken side elevation, showing a glassworking chuck embodying aspects of the invention configured as a scroll chuck with the chuck jaws relatively open, taken at 2—2 in FIG. 1.
Figure 2:
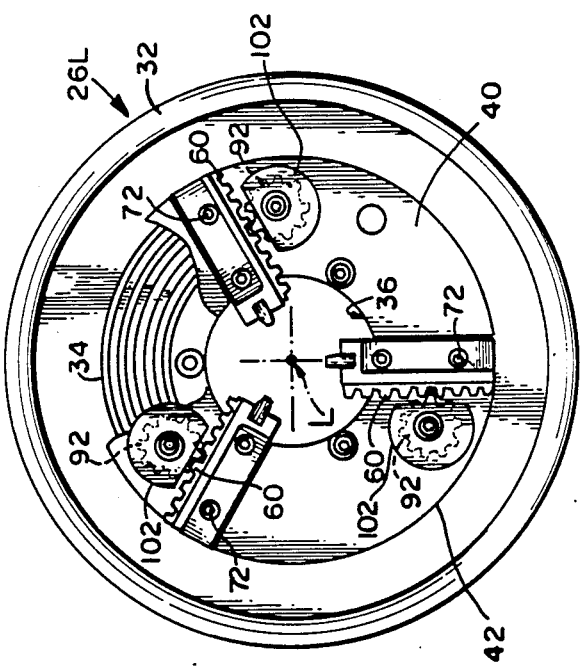
FIG. 2 is a broken side elevation, showing a glassworking chuck embodying aspects of the invention configured as a scroll chuck with the chuck jaws relatively closed, taken at 2—2 in FIG. 1.

Referring to FIGS. 2 and 3 in addition to FIG. 1, a chuck 26L embodying aspects of the invention is generally shown configured as a scroll chuck. In the configuration illustrated in FIGS. 2 and 3, there is illustrated a handwheel assembly 32 having a longitudinally projecting continuous spiral gear tooth 34 formed thereon with spiral gear tooth 34 defining a radially extending path of spiral movement relative to an axis of rotation of the handwheel, upon rotation of the handwheel. Handwheel 32 is rotatable about a longitudinal axis designated generally L in FIG. 1 and indicated by a dot in FIGS. 2 and 3 where the dot is located generally at the point of convergence of jaw members of chuck 26L.

At the center of spiral gear tooth 34 which defines a scroll gear, a cut-out 36 is formed to permit passage therethrough of a drive spindle nose portion of lathe 10. The drive spindle nose portion is not shown in FIGS. 2 and 3, but is rotatably connected to motor 18 via rotary motion transmitting means 24 in a manner known in the art and as described above.

Bolted to the drive spindle nose and covering spiral gear tooth 34 is a chuck body 40 of generally circular configuration which includes a cylindrical edge portion 42 visible in FIG. 1. Chuck body 40 has been broken away in FIG. 2 to facilitate illustration of spiral or scroll gear tooth 34.

Figure 6:
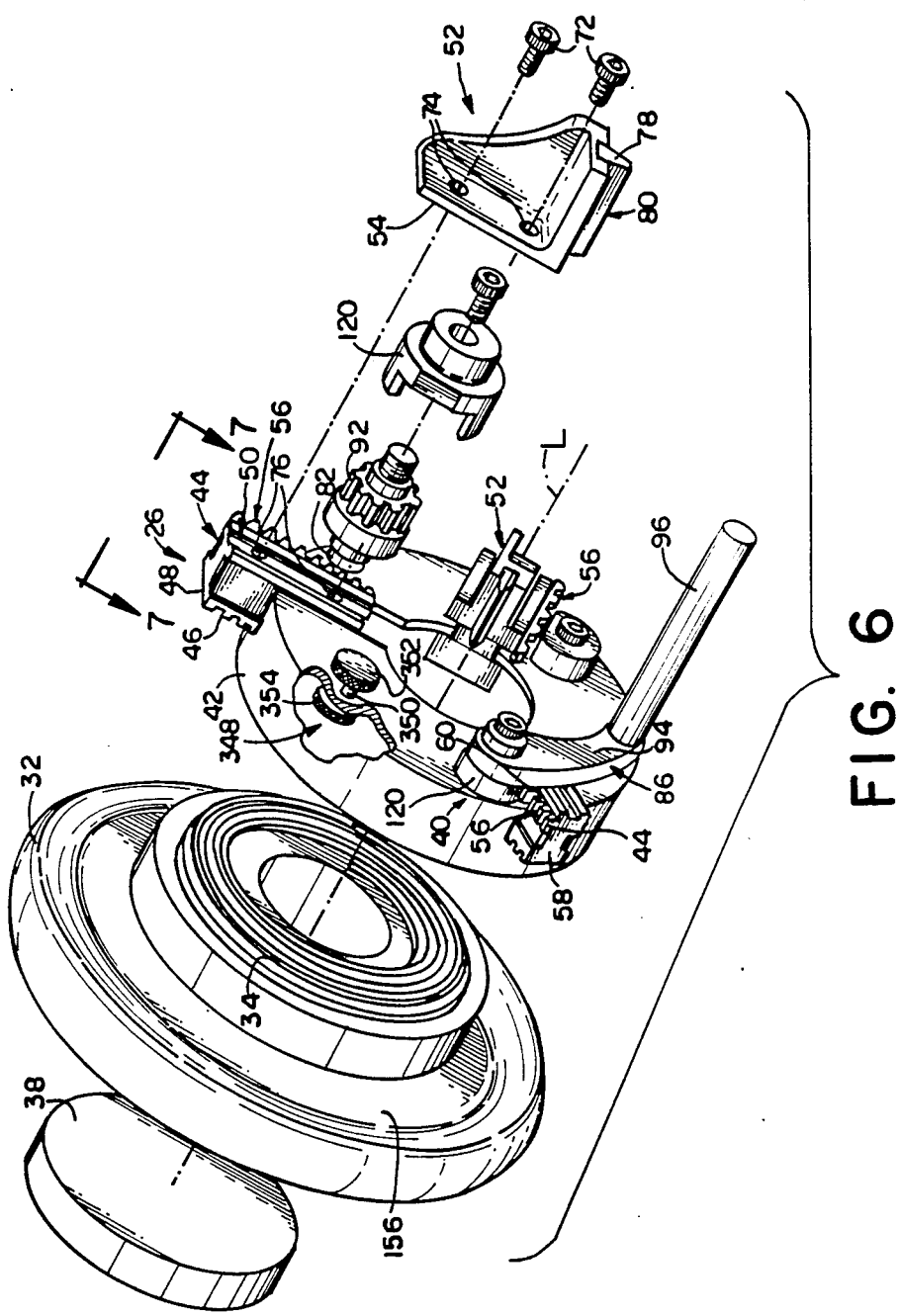
FIG. 6 is an exploded isometric view of a portion of a chuck for a glassworking lathe embodying aspects of the invention.

Referring to FIG. 6 where a chuck embodying the invention is designated generally 26 and is shown in exploded, isometric form, chuck 26 includes a plurality of generally radially disposed jaw base members designated generally 44. Each jaw base member 44 has a generally I-beam-like cross-section taken in the radial direction with respect to axis of rotation L illustrated in FIG. 6. As best illustrated in FIG. 6, each one of the I-beam-like cross-section jaw base members 44 includes a set of spiral gear grooves 46 formed on a base 48 of the I-beam-like member 44 where spiral gear grooves 46 are provided for meshingly engaging spiral gear tooth 34. Jaw base members 44 are preferably located at positions evenly angularly spaced about axis L so that upon rotation of hand wheel 32 and spiral gear tooth 34, jaw base members 44 move radially with respect to axis L due to gear engagement of spiral grooves 46 with spiral gear tooth 34.

Each of jaw base members 44 includes a longitudinally facing surface 50 which is adapted for complemental mating with a corresponding mating surface of a jaw outer member designated generally 52 in FIG. 6. Jaw outer member 52 includes a surface 54 configured for facing, complemental mating with surface 50 of jaw base member 44.

Each jaw base member includes a radially extending gib 56 connected to an appropriate surface of a web portion 58 of the I-beam-like jaw base member. Each gib 56 includes a radially extending rack 60 which projects generally outwardly from and generally transversely with respect to web portion 58 of the I-beam-like jaw base member 44; this construction is best illustrated in FIGS. 2, 3, 6 and 7.

Figure 7:
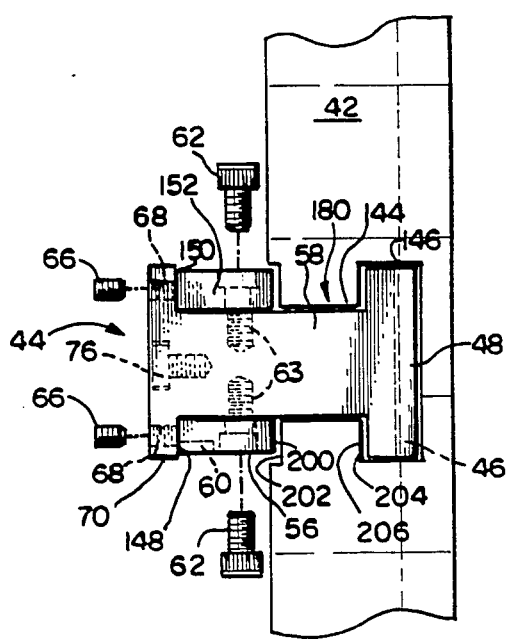
FIG. 7 is a broken partial sectional view taken generally at 7—7 in FIG. 6 illustrating the assembly of the jaw base members and chuck body of a chuck embodying aspects of the invention.

To retain gibs 56 in engagement with webs 58 of the I-beam-like jaw base members, machine screws 62 pass through clearance holes 64 formed in the gibs and threadedly engage the I-beam-like jaw base members via tapped holes formed in the I-beam-like jaw base members generally transversely to web 58. To adjustably longitudinally position the gibs and to maintain them in position along the height of the webs 58 extending generally in the radial direction with respect to axis L, set screw means 66 are provided threadedly engaging tapped holes 68 formed in an outboard flange 70 of I-beam-like jaw base member 48. Set screw means 66 abut the gib as necessary in order to adjustably longitudinally position the gib 56, to adjustably position the gib as required as a result of wear caused by repeated opening and closing of the jaws of chuck 26. The wear occurs between a bottom surface 200 of the gib 56 and a milled track surface 202 formed in chuck body 40; these surfaces are illustrated in FIG. 7.

Outer jaw members 52 are removably connected to jaw base members 44 via appropriate machine screws 72 which pass through clearance holes 74 in outer jaw members 52 and engage appropriately tapped holes 76 formed in jaw base member 44.

Each outer jaw member 52 includes a longitudinally extending radially tapered heat resistant member 78 having a contact surface 80 formed thereon for contactingly engaging the glass workpiece upon closure of the jaw members thereabout by action of rotation of scroll gear 34.

Chuck body 40 includes three slots 180 radially disposed therein for receipt of base portions 48 of jaw base members 44. These slots fit closely about webs 58 of I-beam-like jaw base members 44, as best illustrated in FIG. 7. Note that slots 180 are sized to provide free, sliding movement of jaw base members 44 in the radial direction with respect to axis L upon rotation of spiral gear 34. Slots 180 are dimensioned to provide slight clearance between cylindrical edge portion 42 and I-beam-like jaw base members 44 except in the area of the upper surface 204 of the base member 44 and the corresponding facing surface 206 of the slot 180; surfaces 204 and 206 are in metal-to-metal sliding contact.

When wear occurs between bottom surface 200 of gib 56 and milled track surface 202 formed in chuck body 40, surfaces 204 and 206 separate. Adjustment of set screw means 66 and consequent repositioning of gib 56 permits sliding metal-to-metal contact of surfaces 204 and 206 to be reestablished.

Note that gibs 56 and their associated radially extending racks 60 are all formed on common sides of respective jaw base members 44 as clearly illustrated in FIGS. 2 and 3.

Chuck body 40 further includes a plurality of tapped holes 82 formed immediately adjacent to jaw base members 44 at the sides thereof where gibs 56 and radially extending racks 60 are mounted. Tapped holes 82 are adapted to receive inserts 84 which are threaded both internally and externally; the external threads formed on insert 84 engage the threads interior of tapped hole 82.

A plurality of planetary beam assemblies designated generally 86 and illustrated best in FIGS. 4, 5, 6 and 8 threadedly engage inserts 84 and hence are mounted in generally rotatable engagement with chuck body 40. The planetary beam assemblies 86 engage racks 60 of adjacent gibs 56, in a manner described in greater detail below, and are movable rotatably in sockets defined by inserts 84 about axes parallel to longitudinal axis L, upon radial movement of a jaw base member and an associated gib 56 and rack 60 with respect to axis L.

Figure 8:
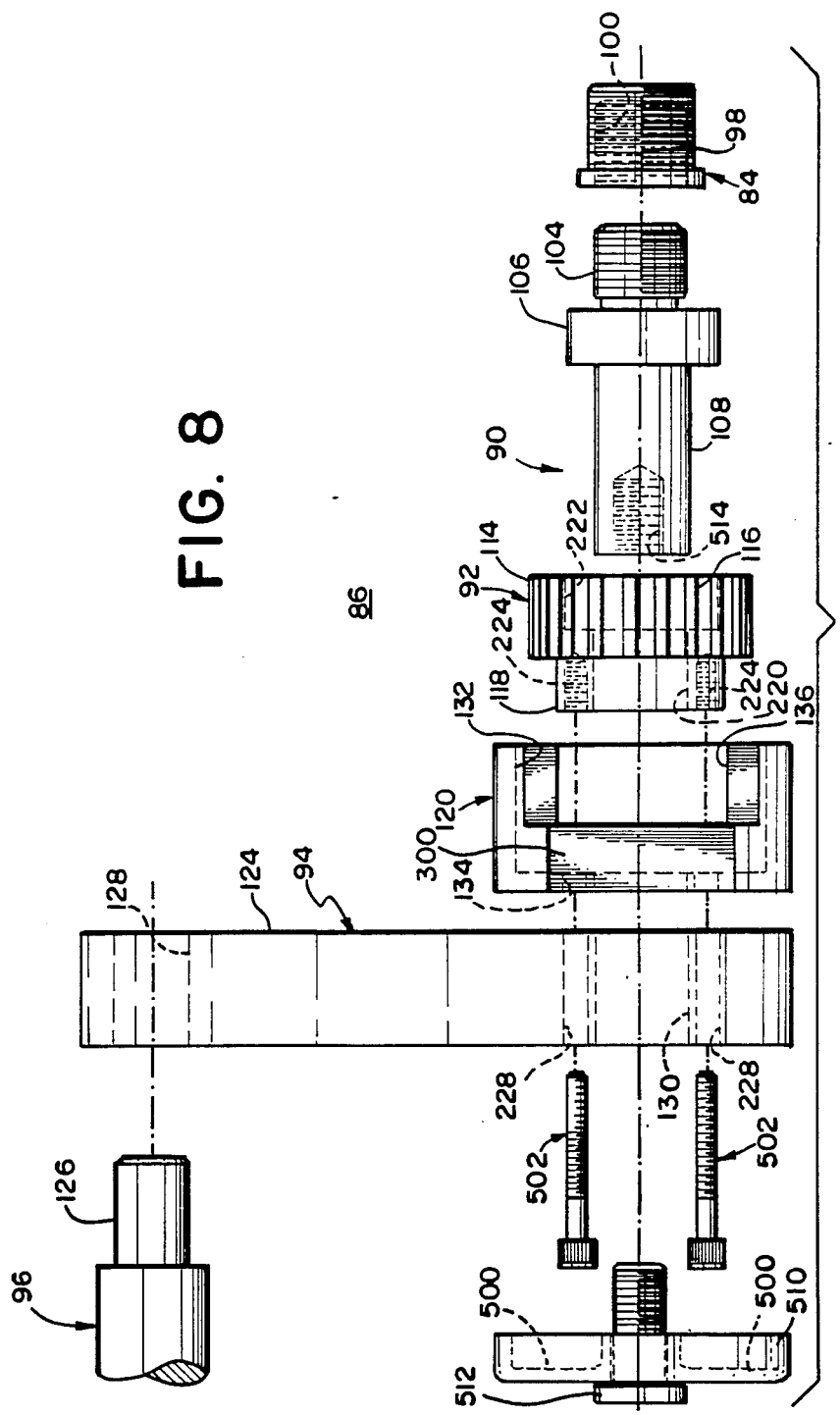
FIG. 8 is an exploded schematic view, shown generally in side elevation, illustrating one of the planetary beam assembly portions of the invention.

Each of the planetary beam assemblies includes, as is generally illustrated in FIG. 8, a pivot pin 90, adapted for mounting engagement within the socket defined by insert 84 to define an axis of rotation of a pinion gear portion of the planetary beam assembly. An arm which is disposed generally transversely with respect to the longitudinal axis L and is rotatable unitarily with the pinion gear about the pivot pin is designated generally 94. Mounted to the arm and extending longitudinally therefrom is a jaw rod 96 at the end of arm 94 remote from pivot pin 90.

The construction of planetary beam assembly 86 is best shown in FIG. 8 where insert 84 is shown to include external threads 98 and internal threads 100 for mounting in chuck body 40. Pivot pin 90 illustrated in FIG. 8 includes a threaded end stud 104 having external threads for engaging internal threads 100 in receptacle 84, a shoulder portion 106 and a cylindrical portion 108 forming a bearing surface for rotation of pinion gear 92 and arm 94 thereabout. Pinion gear 92 generally includes a portion of larger diameter 114 having gear teeth 116 formed thereon and cut for meshing engagement with a radially extending rack 60 formed on a gib 56 secured to a jaw base member 44 to which planetary beam assembly 86 is generally adjacent. Pinion gear 92 further includes a shoulder portion 118 of reduced diameter relative to portion 114; shoulder portion 118 forms a bearing surface for a floating pinion gear shield designated generally 120 in FIG. 8.

Jaw rod 96 is preferably of generally cylindrical configuration and extends outwardly from arm 94 in a direction oppositely to surface 124 and includes a cylindrical shoulder portion 126 adapted for press fitting or other tight engagement into arm 94 via an appropriate passageway 128 formed in the extremity of arm 94 remote from a passageway 130 facilitating connection of arm 94 with pinion gear 92.

Pinion gear 92 includes an internal bore 220 sized for running contact with cylindrical portion 108 of pivot pin 90. Pinion gear 92 further includes a counterbore 222 sized for running contact with shoulder 106 of pin 90. Three tapped holes 224 are formed in the pinion gear shoulder portion 118 to threadedly secure suitable cap screws 226 which pass through clearance holes 228 in arm 94, to connect arm 94 to pinion gear 92 for unitary rotation therewith.

As visible in FIG. 8, arm 94 includes suitable clearance holes 228 for passage therethrough of appropriate cap screws of the socket head type to secure together arm 94 and pinion gear 92. The appropriate socket cap screws designated generally 502 pass through bores 228 in arm 94 and are received in threaded holes 224 in pinion gear 92.

Planetary beam assembly 86 further includes an arm assembly cap 510 which includes suitable undercuts 500 for clearance of the heads of cap screws 502. Arm assembly cap 510 is secured to arm 94, pinion gear 92 and pin 90 via another suitable socket head cap screw 512 which is received in a threaded bore 514 formed in pin 90, all as shown in FIG. 8.

When planetary beam 86 is assembled, pinion gear 92 is positioned in freely rotatable engagement about cylindrical portion 108 of pivot pin 90.

Floating pinion gear shield 120 is positioned about pinion gear 92. Gear shield 120 includes an internal bore 132 of diameter slightly larger than tooth portion 114 of pinion gear 92 and a smaller internal bore 134 of slightly larger diameter than reduced diameter portion 118 of pinion gear 92. Gear shield 120 is completely circularly enclosed at smaller internal bore 134 but includes a sector-shaped cut-out 136 at larger internal bore 132, to permit gear teeth 116 on pinion gear 92 to meshingly engage a rack 60 portion of the gib 56 affixed to an adjacent jaw base member 44.

Figure 9:
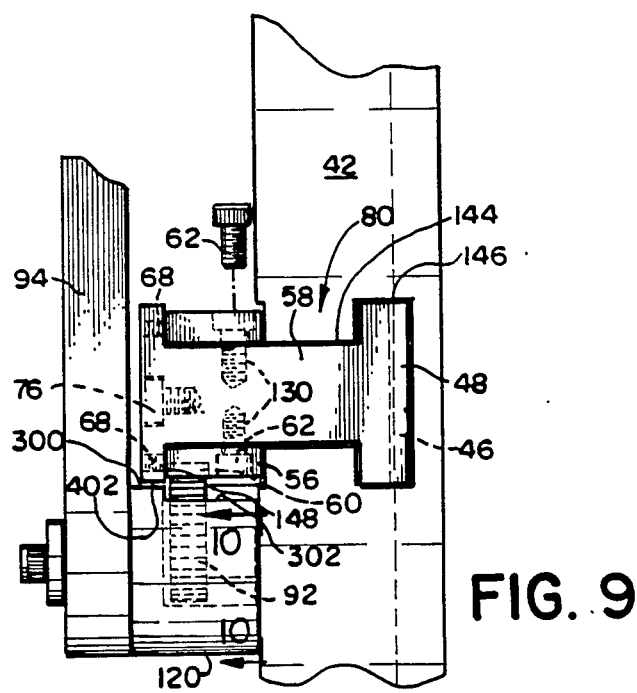
FIG. 9 is a broken partial sectional view taken generally at 7—7 in FIG. 6 illustrating the assembly of the jaw base member and the planetary beam assembly in a chuck embodying aspects of the invention.

Referring once again to FIG. 6, a complete planetary beam assembly illustrated generally at the lower portion of chuck body 40 in the drawing shows the planetary beam assembly connected together with chuck body 40, with floating pinion gear shield 120 covering the pinion gear. It is to be understood that the pinion gear portion of planetary beam member assembly 86 illustrated in FIG. 6 is in engagement with rack 60 of gib 56 all as illustrated in FIG. 6. When the complete planetary beam assembly is connected together with chuck body 40, the floating pinion gear shield 120 cannot rotate about pinion gear 92 due to interference between pinion gear shield 120 and the adjacent jaw base member 44 at the flat 300 formed on the exterior of floating gear shield 120; the flat is best shown in FIGS. 9 and 10.

Figure 5:
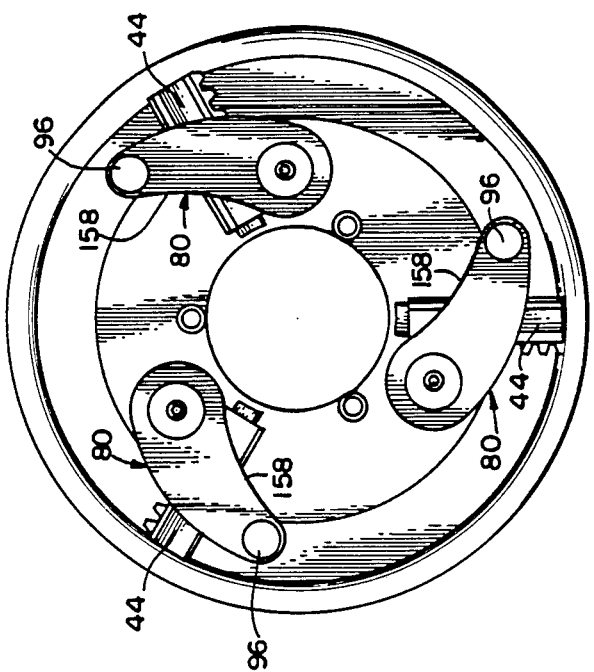
FIG. 5 is a broken side elevation, showing a glassworking chuck embodying aspects of the invention, configured as a planetary chuck, with the chuck jaws and jaw rods relatively open, taken at 4—4 in FIG. 1.
Figure 4:
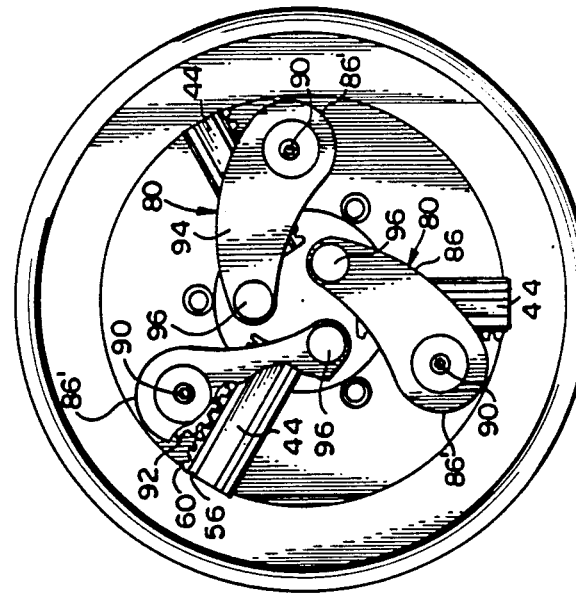
FIG. 4 is a broken side elevation, showing a glassworking chuck embodying aspects of the invention, configured as a planetary chuck, with the chuck jaws and jaw rods relatively closed, taken at 4—4 in FIG. 1.

Referring to FIGS. 4 and 5, in FIG. 4 three planetary beam member assemblies 86 have been illustrated generally with one of those planetary beam member assemblies 86' having its arm portion 94 cut away to illustrate engagement of the pinion gear 92 with rack 60 of a gib 56. The relative positioning of jaw rods 96 illustrated in FIG. 4 shows that when the chuck of the invention is configured using the planetary beam assemblies, the jaw rods 96 may be closed closely together, to contact one another or to hold an ultrasmall workpiece and can spread apart quite far, as illustrated in FIG. 5, to hold a very large workpiece being turned by the lathe 10. From viewing FIGS. 4 and 5 it is apparent that upon radial movement of jaw base members 44 in a radially outward direction, from the positions shown in FIG. 4 to the positions shown in FIG. 5, such radially outward movement of jaw base members 44 results from rotation of pinion gear 92 due to the meshing engagement of racks 60 with the gear teeth of pinion gears 92 thereby resulting in rotation of the planetary beam members 80, from the positions illustrated in FIG. 4 to the positions illustrated in FIG. 5, thereby permitting the chuck to accommodate a large workpiece.

Referring to FIGS. 2 and 3, the chuck of the invention is illustrated configured as a scroll chuck, having jaw outer members 52 affixed to jaw base members 44 via machine screws 72 as illustrated in more detail in FIG. 6. Some of machine screws 72 have not been numbered in FIGS. 2 and 3 to aid the clarity of the drawing. In FIGS. 2 and 3, while pinion gears 92 have been illustrated, principally to show how pinion gears 92 meshingly engage racks 60, it is to be understood that pinion gears 92 are parts of planetary beam assemblies 86 and, consequently, are not positioned in meshing engagement with racks 60 when the chuck of the invention is configured as a scroll chuck with jaw outer members 52 in place as illustrated in FIGS. 2 and 3. In fact the planetary beam assemblies cannot be there; if they were they would interfere with the jaw outer members 52.

Referring to FIG. 6, it is specifically to be understood that FIG. 6 is for purposes of illustrating the assembly of parts only and that the chuck of the invention would never be configured as illustrated in FIG. 6, when in use. Specifically, the user of the invention configures the chuck either as a scroll chuck, with jaw outer members 52 engaging jaw base members 44 and secured in place by machine screws 72, in which case planetary beam assemblies 86 are removed from chuck body 40 and from engagement with racks 60, or the user configures the chuck of the invention as a planetary chuck, in which case machine screws 72 are removed, jaw outer members 52 are taken away and the planetary beam assemblies 86 are positioned by threadedly engaging first threaded stud portion 104 of pivot pin 90 in threaded engagement with tapped hole 100, in receptacle 84 engaging tapped hole 82 in chuck body 40, and floating pinion gear covers 120 are rotated so that pinion gears 92 can meshingly engage racks 60 through sector-shaped cut-out 136 formed in floating pinion gear covers 120.

Referring to FIG. 7, the assembly of a jaw base member 44 together with its associated gib 56 having a radially extending rack formed as a part of gib 56 is illustrated generally schematically. Gib 56 and its associated radially extending rack 60 are assembled in facingly abutting contact with a web 58 of the I-beam-like jaw base member 44. Gib 56 is secured in place in facing abutment with a generally vertically extending surface of web 58 via machine screws 62 which secure gibs 56 to webs 58 of I-beam-like jaw base members 44. Screws 62 are threadedly received by tapped holes 63 formed in the web 58, all as illustrated schematically in FIG. 7. Further with reference to FIG. 7, the slot 180 formed in chuck body 40 and in a cylindrical edge 42 of chuck body 40 includes a relatively narrow portion 144, which is only slightly wider than web 58 of jaw base member 44, and includes a wider portion 146, disposed below narrow portion 144 and sized for free passage of the base 48 of I-beam-like jaw base member 44 therethrough. Spiral gear grooves 46 are indicated by dotted lines at the bottom of base 48 in FIG. 7. The clearance between base 48 and wider portion 146 of slot 180 has been exaggerated for purposes of clarity of the drawing.

Set screws 66 threadedly engage tapped holes 68 formed in an outboard flange 70 of I-beam-like jaw base member 48 and bear upon longitudinally facing surfaces 148, 150 of a gib 56 which includes a radially extending rack 60, as well as a gib 152 which has no such radially extending rack. Because gibs 56 and racks 60 wear over time, set screws 66 engaging threaded passageways 68 and bearing upon surface 148 permit the radial position of gibs 56 and 152 to be adjusted periodically relative to jaw base member 44, as required.

Referring once again to FIG. 6, the jaw base member 44, illustrated closest to the lower left-hand side of the drawing is illustrated with one of the planetary beam assemblies in engagement therewith. The jaw base member illustrated closest to the top of the drawing is illustrated with one of the jaw outer members 52 ready to be secured thereto via machine screws 72 and with a pinion gear 92 illustrated in proximity with the jaw base member 44, to indicate the manner in which pinion gear 92 engages rack 60 of gib 56 associated with that jaw base member 44. The remaining jaw base member 44, over which passes axis of rotation L, is illustrated with a jaw outer member 52 secured in place thereon. In FIG. 6 it is to be understood that the floating pinion gear shield 120 illustrated exploded away from pinion gear 92 in the neighborhood of the jaw base member closest to the top of the drawing would not be used separately as illustrated there, but is a portion of a planetary beam member assembly 86; the illustration of the floating pinion gear shield being only for purposes of understanding the assembly of the parts of the invention.

Still further to FIG. 6, another aspect of the invention resides in a hand operable lock for securing the spiral gear tooth 34, which is affixed to handwheel 32, in fixed, immovable relationship with respect to chuck body 40. This lock device is designated generally 348 and includes a threaded shaft member 350 threadedly engaging a suitably tapped hole, which is not numbered in FIG. 6, formed in chuck body 40 generally parallel with the axis of rotation L. Secured to threaded shaft 350 is a knurled handle 352 which is exterior of chuck body 40 as illustrated in FIG. 6. Interior of chuck body 40 and secured to threaded shaft 350 is a lock pad 354, which is preferably, but not necessarily, of generally circular configuration as illustrated in FIG. 6. Lock pad 354, knurled handle 352 and threaded shaft 350 are all positioned radially displaced from axis of rotation L so that when knurled handle 352 is rotated, thereby advancing threaded shaft 350 and lock pad 354 generally to the left when viewing FIG. 6, lock pad 352 contacts generally spiral gear tooth 34 of the handwheel 32-spiral gear 34 assembly. Hence, an operator, by rotating knurled handle 352 in a clockwise direction when considering FIG. 6 can tighten lock pad 354 against the spiral gear 34 thereby precluding any relative movement between the assembly of handwheel 32 and spiral gear 34 and the chuck body. This, of course, is highly desirable in order to assure that the chuck does not open during operation of the machine.

It is to be understood, referring to FIG. 1, that while the lathe embodying the invention has been illustrated with one of the chucks 26L configured as a scroll chuck and the remaining chuck 26R configured as a planetary chuck, in actual use, both chucks 26 will generally be configured either as scroll or planetary chucks, depending on the configuration of the workpiece of interest.

As yet another feature of the invention, reference is made to FIGS. 4 and 5 where the curved outer surfaces of arms 94 are especially well shown. Note that the curved inner surface 158 of each of arms 94 has a generally concave configuration. This concave configuration ensures that when the planetary beam member assemblies are closed about a workpiece, jaw rods 96 contact the workpiece before any portion of arm 94 interferes with the workpiece.

Referring to FIG. 9, the floating pinion gear shield 120 is shown with the sector-shaped cutout 136 positioned proximate rack 60 and permitting meshing engagement between pinion gear 92 and rack 60. Pinion gear floating gear shield 120 further includes a surface portion 300, which is not cut away in the manner of sector-shaped cutout 130, which facingly contacts surface 402 which is a lateral surface of the outboard flange 70 of the I-beam-like jaw base member 48. This contact between surfaces 300 and 402 precludes movement of floating pinion gear shield 120 about the axis of rotation of the pinion gear 92 as the pinion gear rotates due to meshing engagement with rack 60. Consequently, it is to be noted that in looking at FIG. 9, movement in and out of the plane of the paper of the jaw member base portion 44 and associated rack 60 results in rotary motion of pinion gear 92 meshingly engaging rack 60 and resultant rotary motion of arm 94 while pinion gear shield 120 remains stationary.

Referring to FIG. 10, it is seen that floating pinion gear shield 120 includes two flats, one of which is 300 and illustrated in FIG. 9 and the other of which is designated 302 formed immediately adjacent to sector-shaped cutout 130. Note that flat 300 rides against a lateral surface of the head of I-beam-shaped jaw base member 44. Flat 302 is slightly removed from the face of the rack thereby permitting the meshing engagement of the pinion gear and the rack without substantial contact of the rack with the pinion floating gear shield 120.

Referring to FIG. 11 and to FIG. 12 there is illustrated means for adjustably radially positioning gib 56 where the gib radial positioning means includes a screw 500 threadedly engaging a tapped hole bored in the radial direction in the web portion of the I-beam-shaped jaw base member 44. As illustrated in FIG. 11, screw 500 is backed out of its tapped hole, washer 504 is backed up against the head of screw 500 and gib 56 is moved manually to the right, considering FIG. 11, until gib surface 506 contacts the facing surface of washer 504. The gib may, of course, be moved to the left by rotating screw 500 until washer 502 abuts the end of I-beam-shaped jaw base member 44. This gib adjustment means facilitates adjustment of each of the planetary beam assemblies so that the pinion gears thereof appropriately engage their associated gibs in a manner that the three jaw rods of the three planetary beam assemblies all converge uniformly and contact one another at the axis of rotation L when the chuck of the invention is configured as a planetary chuck.

It is specifically to be noted in FIGS. 2, 3, 4, 5 and 6 that the center of the chuck of the invention is open. This is important in order to allow tubular glass to be machined using a lathe equipped with a chuck embodying the invention and to allow appropriate gas to be passed through the tubular glass workpiece during machining thereof via connection at the ends of the tubular glass workpiece retained by the chuck.

I claim the following:

1. A chuck for a glass working lathe, comprising:
   a. chuck body means rotatable about a longitudinal axis;
   b. means, rotatable about said longitudinal axis independently of said chuck body means, for defining a path of spiral movement relative to said axis upon rotation thereof;
   c. support means for following said spiral path, movable along said path with respect to said axis responsively to rotation of said path defining means, for supporting jaw means and for translating said spiral movement into transverse motion of said support means and any jaw means supported thereby;
   d. said jaw means adapted for removable connection with said support means in the absence of planetary beam assemblies being connected with said support means, moveable with said support means, for radially convergingly grasping a glass workpiece;
   e. said chuck body defining means for retaining said support means in engagement with said path defining means, having said support means resident therein, for radial travel of said jaw means responsively to rotation of said path defining means relative to said chuck body means;
   f. planetary beam means, adapted for removable pivotal connection with said chuck body means and engaging said support means in the absence of said jaw means, movable about axes parallel said longitudinal axis, for angularly convergingly grasping a glass workpiece responsively to covergence of said support means resulting from rotation of said path defining means relative to said chuck body means.

2. The chuck of claim 1 wherein said path defining means defines a radially extending path of spiral movement relative to said axis.

3. The chuck of claim 2 wherein said support means is movable radially along said spiral path.

4. The chuck of claim 3 wherein said support means for translating said spiral movement into transverse motion translates said spiral movement into radial transverse motion.

5. The chuck of claim 4 wherein said jaw means is moveable radially with said support means.

6. The chuck of claim 5 wherein said jaw means is moveable unitarily with said support means.

7. The chuck of claim 6 wherein said support means is only partially resident within said chuck body means.

8. The chuck of claim 7 wherein said jaw means travels radially with respect to said chuck body.

9. The chuck of claim 8 wherein said planetary beam means are moveable radially about axes parallel said longitudinal axis.

10. The chuck of claim 9 wherein said planetary beam means are moveable radially rotatably about said axes parallel said longitudinal axis.

11. The chuck of claim 10 wherein said planetary beam means angularly convergingly grasp a glass workpiece responsively to radial convergence of said support means.

12. A chuck for a glass working lathe, comprising:
 a. a chuck body rotatable about a longitudinal axis;
 b. a handwheel rotatable about said longitudinal axis independently of said chuck body, including a longitudinally projecting continuous spiral gear tooth defining a radially extending path of spiral movement relative to said axis upon handwheel rotation;
 c. jaw base members including spiral gear grooves for meashingly engaging said spiral gear tooth, movable radially with respect to said axis upon rotation of said spiral gear tooth engaging said gear grooves;
 d. said jaw base members including radially extending racks;
 e. said outer jaw members being adapted for removable connection with respective jaw base members in the absence of planetary beam assemblies connectable to said respective jaw base members, for grasping a glass workpiece upon convergence of said jaw base members;
 f. said chuck body retaining said spiral grooves of said jaw base members in meshing engagement with said spiral gear and including radially extending slot means having said jaw base members therein, for radial travel of said jaw base members therealong responsively to rotation of said spiral gear tooth relative to said chuck body;
 g. a plurality of planetary beam assemblies adapted for removable pivotal mounting on said chuck body and engaging said jaw base member racks in the absence of said outer jaw members, movable radially rotatably about axes parallel said longitudinal axis for grasping a glass workpiece upon closure of said planetary beam assemblies thereabout responsively to convergence of said jaw base members responsively to rotation of said handwheel relative to said chuck body.

13. The chuck of claim 12 further comprising:
 a. hand adjustable means for releasably securing said handwheel immovably with respect to said chuck body, including:
  i. a threaded hole formed in said chuck body at a position axially aligned with the spiral gear tooth connected to said handwheel; and
  ii. a longitudinally elongated member threadedly engaging said threaded hole in said cover and including a surface portion at the end thereof which engages said threaded hole which is adapted for tightly contacting said spiral gear tooth upon said elongated member being rotated within said threaded hole, for preventing relative rotational movement between said chuck body and said handwheel.

14. The chuck of claim 12 wherein said arm of said planetary beam assembly is cut away between said pin and said jaw rod at the surface which closes towards said longitudinal axis when said jaw base members converge upon rotation of said scroll gear so that the portion of said arm proximate the jaw rod approaches said longitudinal axis without said arm interfering with a workpiece which is to be held and is aligned with said longitudinal axis.

15. The chuck of claim 14 further comprising cylindrical shield members fitted about said pinion gears of said planetary beam members, connected to said arms and rotatable independently of said arms and said pinion gears, having cutouts formed therein for engagement of said racks by said pinion gears via said cutouts.

16. The chuck of claim 12 further comprising means for radially aligning said jaw base members and said outer jaw members when said outer jaw members are mounted on said jaw base members.

17. A chuck for a glass working lathe, comprising:
 a. chuck body means rotatable about a longitudinal axis;
 b. means, rotatable about said longitudinal axis independently of said chuck body means, for defining a path of spiral movement relative to said axis upon rotation thereof;
 c. support means for following said spiral path, movable along said path with respect to said axis responsively to rotation of said path defining means, for translating said spiral movement into radial motion of said support means;
 d. said chuck body defining means for retaining said support means in engagement with said path defining means, having said support means resident therein, for radial travel of said support means responsively to rotation of said path defining means relative to said chuck body means;
 e. planetary beam means, pivotally connected with said chuck body means and engaging said support means, movable about axes parallel said longitudinal axis, for angularly convergingly grasping a glass workpiece responsively to convergence of said support means resulting from rotation of said path defining means relative to said chuck body means.

18. The chuck of claim 17 wherein said planetary beam means are movable radially about axes parallel said longitudinal axis.

19. The chuck of claim 18 wherein said planetary beam means are moveable radially rotatably about said axes parallel said longitudinal axis.

20. The chuck of claim 19 wherein said planetary beam means angularly convergingly grasp a glass workpiece responsively to radial convergence of said support means.

21. A chuck for a glass working lathe, comprising:
   a. a chuck body rotatable about a longitudinal axis;
   b. a handwheel rotatable about said longitudinal axis independently of said chuck body, including a longitudinally projecting continuous spiral gear tooth defining a radially extending path of spiral movement relative to said axis upon handwheel rotation;
   c. base members including spiral gear grooves for meshingly engaging said spiral gear tooth, movable radially with respect to said axis upon rotation of said spiral gear tooth engaging said gear grooves;
   d. said base members including radially extending racks;
   e. said chuck body retaining said spiral grooves of said base members in meshing engagement with said spiral gear and including radially extending slot means having said base members therein, for radial travel of said base members therealong responsively to rotation of said spiral gear tooth relative to said chuck body;
   f. a plurality of planetary beam assemblies pivotally mounted on said chuck body and engaging said base member racks, movable radially rotatably about axes parallel said longitudinal axis for grasping a glass workpiece upon closure of said planetary beam assemblies thereabout responsively to convergence of said base members responsively to rotation of said handwheel relative to said chuck body.

22. A chuck for a glass working lathe, comprising:
   a. chuck body means rotatable about a longitudinal axis;
   b. a handwheel, rotatable about said longitudinal axis;
   c. means for releasably coupling said handwheel to said chuck body for unitary rotation of said handwheel with said chuck body;
   d. said handwheel including a longitudinally projecting continuous spiral gear tooth defining a path of spiral movement relative to said axis upon rotation of said handwheel;
   e. a plurality of generally radially disposed jaw base members, each having generally l-beam--like radial cross-section, each including spiral gear grooves on the base for meshingly engaging said spiral gear tooth, evenly angularly spaced about said axis and movable radially with respect to said axis upon handwheel rotation with said spiral gear tooth engaging said gear grooves on the bases of said l-beam configured jaw base members; each of said jaw base members including an axially facing surface adapted for complemental mating with a corresponding mating surface of a jaw outer member;
   f. said jaw base members each including a radially extending gib connected to a respective web of said jaw base member, each gib including a radially extending rack projecting outwardly from and generally transversely with respect to said web of said jaw base member;
   g. means for adjustably radially positioning said gibs along the length of said webs of said l-beam --configured jaw base member;
   h. means for adjustably longitudinally positioning said gibs along the height of said webs in said longitudinal direction;
   i. said outer jaw members having mating surfaces formed for complemental mating with said jaw base member mating surfaces, being adapted to be removably connected to said jaw base members and including longitudinally extending heat-resistant surfaces adapted for contactingly engaging a glass workpiece upon radial convergence of said jaw base members with resultant radially converging closure of said outer jaw members thereabout;
   j. means for retaining said outer jaw members in removable connection with said jaw base members at said respective mating surfaces;
   k. said chuck body means facing said spiral gear tooth and being rotatable about said axis independently of said handwheel, for retaining said spiral grooves of said jaw base members in meshing engagement with said spiral gear, including radially extending slots having said web portions of said jaw base members resident therein facilitating radial travel of said jaw base members therealong upon rotation of said spiral gear tooth relative to said chuck body;
   l. a plurality of planetary beam assemblies adapted for removable pivotal mounting on said chuck body means in sockets adjacent said racks of said gibs, respective beam assemblies engaging said racks of respective ones of said gibs affixed to respective ones of said jaw base members in the absence of said outer jaw members being mounted on said jaw base members, respective beam assemblies being movable rotatably in said sockets about axes parallel said longitudinal axis upon radial movement of a respective jaw base member and its associated gib engaged by said beam assembly responsively to rotation of said handwheel, each planetary beam assembly including:
      i. a pivot pin adapted for mounting engagement within one of said sockets to define an axis of rotation of a pinion gear portion of said beam assembly;
      ii. a pinion gear rotatable relative to and about said pivot pin and adapted to meshingly engage a radially extending rack of a respective gib affixed to an adjacent jaw base member;
      iii. an arm disposed generally transversely with respect to said longitudinal axis and rotatable with said pinion gear about said pivot pin;
      iv. a jaw rod extending from said arm member parallel to said longitudinal axis and adapted to secure a workpiece upon rotating closure of said arms about said work piece unitarily with rotation of said pinion gear responsively to rotary movement of said handwheel relative to said chuck body and resultant radial movement of said jaw base member and a gib rack engaging said pinion gear; and
   m. means for selectably releasably retaining said planetary beam assemblies in engagement with said sockets with said pins resident within said sockets.

23. The chuck of claim 22 wherein said spiral gear tooth is secured to said handwheel.

24. The chuck of claim 23 wherein said spiral gear defines a radially extending path of spiral movement.

25. The chuck of claim 24 wherein said arm of said planetary beam assembly is rotatable unitarily with said pinion gear about said pivot pin.

26. A lathe especially adapted for glassworking, comprising:
   a. a longitudinally elongated frame;

b. a pair of upright members, mounted on said frame and extending upwardly therefrom, each upright member retaining inwardly facing chucks for holding longitudinally extending generally tubular workpieces therein;

c. a motor;

d. means for transmitting rotational motion from said motor output shaft to said inwardly facing chucks for rotating said chucks and a workpiece held therebetween;

e. at least one of said chucks comprising:
  1. chuck body means rotatably driven about a longitudinal axis by said rotational motion transmitting means;
  2. a handwheel, rotatable about said longitudinal axis;
  3. means for releasably coupling said handwheel to said chuck body for unitary rotation of said handwheel with said chuck body;
  4. said handwheel including a longitudinally projecting continuous spiral gear tooth defining a path of spiral movement relative to said axis upon rotation of said handwheel;
  5. a plurality of generally radially disposed jaw base members, each having generally l-beam---like radial cross-section, each including spiral gear grooves on the base for meshingly engaging said spiral gear tooth, evenly angularly spaced about said axis and movable radially with respect to said axis upon handwheel rotation with said spiral gear tooth engaging said gear grooves on the bases of said l-beam configured jaw base members; each of said jaw base members including an axially facing surface adapted for complemental mating with a corresponding mating surface of a jaw outer member;
  6. said jaw base members each including a radially extending gib connecting to a respective web of said jaw base member, each gib including a radially extending rack projecting outwardly from and generally transversely with respect to said web of said jaw base member;
  7. means for adjustably radially positioning said gibs along the length of said webs of said l-beam-- configured jaw base member;
  8. means for adjustably longitudinally positioning said gibs along the height of said webs in said longitudinal direction;
  9. said outer jaw members having mating surfaces formed for complemental mating with said jaw base member mating surfaces, being adapted to be removably connected to said jaw base members and including longitudinally extending heat-resistant surfaces adapted for contactingly engaging a glass workpiece upon radial covergence of said jaw base members with resultant radially converging closure of said outer jaw members thereabout;
  10. means for retaining said outer jaw members in removable connection with said jaw base members at said respective mating surfaces;
  11. said chuck body means facing said spiral gear tooth and being rotatable about said axis independently of said heandwheel, for retaining said spiral grooves of said jaw base members in meshing engagement with said spiral gear, including radially extending slots having said web portions of said jaw base members resident therein facilitating radial travel of said jaw base members therealong upon rotation of said spiral gear tooth relative to said chuck body;
  12. a plurality of planetary beam assemblies adapted for removable pivotal mounting on said chuck body means in sockets adjacent said racks of said gibs, respective beam assemblies engaging said racks of respective ones of said gibs affixed to respective ones of said jaw base members in the absence of said outer jaw members being mounted on said jaw base members, respective beam assemblies being movable rotatably in said sockets about axes parallel said longitudinal axis upon radial movement of a respective jaw base member and its associated gib engaged by said beam assembly responsively to rotation of said handwheel, each planetary beam assembly including:
    i. a pivot pin adapted for mounting engagement within one of said sockets to define an axis of rotation of a pinion gear portion of said beam assembly;
    ii. a pinion gear rotatable relative to and about said pivot pin and adapted to meshingly engage a radially extending rack of a respective gib affixed to an adjacent jaw base member;
    iii. an arm disposed generally transversely with respect to said longitudinal axis and rotatable with said pinion gear about said pivot pin;
    iv. a jaw rod extending from said arm member parallal to said longitudinal axis and adapted to secure a workpiece upon rotating closure of said arms about said work piece unitarily with rotation of said pinion gear responsively to rotary movement of said handwheel relative to said chuck body and resultant radial movement of said jaw base member and a gib rack engaging said pinion gear, and
  13. means for selectably releasably retaining said planetary beam assemblies in engagement with said sockets with said pine resident within said sockets.

27. The lathe of claim 26 wherein said chuck further comprises:
  a. hand adjustable means for releasably securing said handwheel immovably with respect to said chuck body, including:
    i. a threaded hole formed in said chuck body at a position axially aligned with the spiral gear tooth connected to said handwheel;
    ii. longitudinally elongated member threadedly engaging said threaded hole in said cover and including a surface portion at the end thereof which engages said threaded hole which is adapted for tightly contacting said spiral gear tooth upon said elongated member being rotated within said threaded hole, for preventing relative rotational movement between said chuck body and said handwheel.

28. The lathe of claim 21 wherein said arm of said planetary beam assembly is cut away between said pin and said jaw rod at the surface which closes towards said longitudinal axis when said jaw base members converge upon rotation of said scroll gear so that the portion of said arm proximate the jaw rod approaches said longitudinal axis without said arm interfering with a workpiece which is to be held and is aligned with said longitudinal axis.

29. The lathe of claim 28 further comprising cylindrical shield members fitted about said pinion gears of said planetary beam members, connected to said arms and rotatable independently of said arms and said pinion gears, having cutouts formed therein for engagement of said racks by said pinion gears via said cutouts.

30. The lathe of claim 29 further comprising means for radially aligning said jaw base members and said outer jaw members when said outer jaw members are mounted on said jaw base members.

31. A lathe especially adapted for glassworking, comprising:
   a. a longitudinally elongated frame;
   b. a pair of upright members, mounted on said frame and extending upwardly therefrom, each upright member retaining an inwardly facing chuck for holding longitudinally extending generally tubular workpieces therein;
   c. a motor;
   d. means for transmitting rotational motion from said motor output shaft to said inwardly facing chucks for rotating said chucks and a workpiece held therebetween;
   e. at least one of said chucks comprising:
      1. chuck body means rotatably driven about a longitudinal axis by said rotational motion transmitting means;
      2. means, rotatable about said longitudinal axis independently of said chuck body means, for defining a path of spiral movement relative to said axis upon rotation thereof;
      3. support means for following said spiral path, movable along said path with respect to said axis responsively to rotation of said path defining means, for supporting jaw means and for translating said spiral movement into transverse motion of said support means and any jaw means supported thereby;
      4. said jaw means adapted for removable connection with said support means in the absence of planetary beam assemblies being connected with said support means, moveable with said support means, for radially convergingly grasping a glass workpiece;
      5. said chuck body defining means for retaining said support means in engagement with said path defining means, having said support means resident therein, for radial travel of said jaw means responsively to rotation of said path defining means relative to said chuck body means;
      6. planetary beam means, adapted for removable pivotal connection with said chuck body means and engaging said support means in the absence of said jaw means, movable about axes parallel said longitudinal axis, for angularly convergingly grasping a glass workpiece responsively to convergence of said support means resulting from rotation of said path defining means relative to said chuck body means.

32. A lathe especially adapted for glassworking, comprising:
   a. a longitudinally elongated frame;
   b. a pair of upright members, mounted on said frame and extending upwardly therefrom, each upright member retaining an inwardly facing chuck for holding longitudinally extending generally tubular workpieces therein;
   c. a motor;
   d. means for transmitting rotational motion from said motor output shaft to said inwardly facing chucks for rotating said chucks and a workpiece held therebetween;
   e. at least one of said chucks comprising:
      1. a chuck body rotatably driven about a longitudinal axis by said rotational motion transmitting means;
      2. a handwheel rotatable about said longitudinal axis independently of said chuck body, including a longitudinally projecting continuous spiral gear tooth defining a radially extending path of spiral movement relative to said axis upon handwheel rotation;
      3. base members including spiral gear grooves for meshingly engaging said spiral gear tooth, movable radially with respect to said axis upon rotation of said spiral gear tooth engaging said gear grooves;
      4. said base members including radially extending racks;
      5. said chuck body retaining said spiral grooves of said base members in meshing engagement with said spiral gear and including radially extending slot means having said base members therein, for radial travel of said base members therealong responsively to rotation of said spiral gear tooth relative to said chuck body;
      6. a plurality of planetary beam assemblies pivotally mounted on said chuck body and engaging said base member racks, movable radially rotatably about axes parallel said longitudinal axis for grasping a glass workpiece upon closure of said planetary beam assemblies thereabout responsively to convergence of said base members responsively to rotation of said handwheel relative to said chuck body.

* * * * *